United States Patent Office 3,341,544
Patented Sept. 12, 1967

3,341,544
QUINOLINE LACTAMS
Robert I. Meltzer, White Meadow Lake, Rockaway, and Richard E. Brown, Hanover, N.J., assignors to Warner-Lambert Pharmaceutical Company, Morris Plains, N.J., a corporation of Delaware
No Drawing. Original application Oct. 23, 1963, Ser. No. 318,190. Divided and this application Aug. 10, 1966, Ser. No. 571,385
14 Claims. (Cl. 260—286)

This is a divisional application of applicants' copending application Ser. No. 318,190, filed Oct. 23, 1963, which is in turn a continuation-in-part of Ser. No. 248,872, filed Jan. 2, 1963.

This invention relates to novel substituted lactams having the following structural formula:

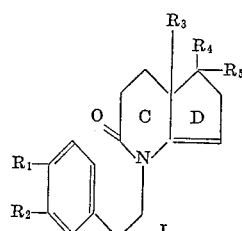
I

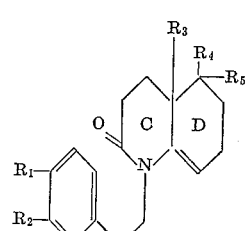
II

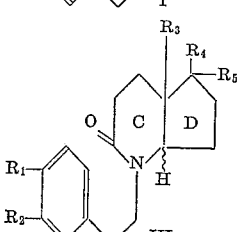
III

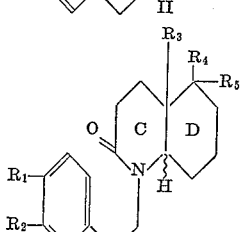
IV

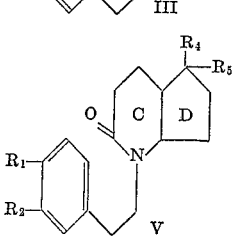
V

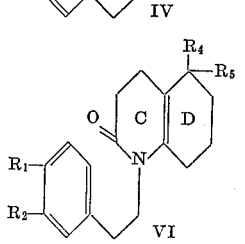
VI wherein $R_1$ and $R_2$ each represents hydrogen, hydroxy, or lower alkoxy such as methoxy or methylene dioxy; $R_3$ represents hydrogen or lower alkyl such as methyl or ethyl; $R_4$ represents hydrogen, lower alkyl such as methyl or ethyl, or alkoxy such as ethoxy; $R_5$ represents hydrogen, hydroxy, acyloxy, alkoxy,

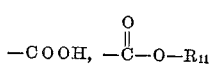

in which $R_{11}$ is lower alkyl such as methyl or ethyl,

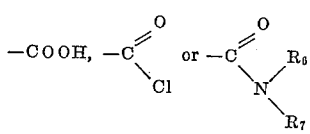

in which $R_6$ and $R_7$ may be hydrogen, lower alkyl or $R_6$ and $R_7$ taken together with the nitrogen to which they are attached form a heterocyclic radical such as

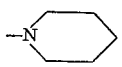

or $R_4$ and $R_5$ taken together with the carbon atom to which they are attached represent a keto radical such as

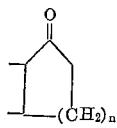

or a cyclic ketal radical such as

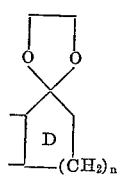

in which $n$ is an integer of from 1 to 2. The use of a wiggly line in the above formula denotes that the orientation of the hydrogen atom can be either cis or trans with respect to the orientation of $R_3$. On the other hand, the use of a dotted line denotes trans orientation and the use of a solid line denotes cis orientation.

This invention also encompasses within its scope a novel process for the production of the above compounds.

The novel compounds of this invention are valuable intermediates for the production of certain substituted quinolizines such as those of the formula:

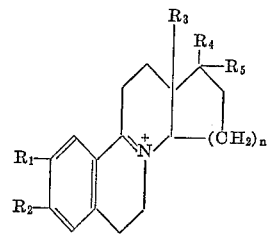

These substituted quinolizines are, of course, related to the cyclopentanophenanthrenes and are important therapeutic agents useful in the treatment of circulatory collapse or endocrine disorders.

We have found that compounds of this invention may be produced in accordance with the reactions as exemplified in the following series of equations. The symbols $R_1$, $R_2$, $R_3$, $R_4$ and $R_5$ and $n$ used hereinafter have the same meaning as defined above.

Step I involves the condensation reaction of substituted phenylalkylamines such as

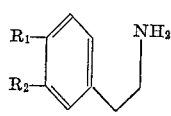

by refluxing for about 3 to 6 hours in an inert organic solvent such as xylene with an equal molar ratio of a keto ester or acid such as carbalkoxyethyl cycloalkanone of the formula:

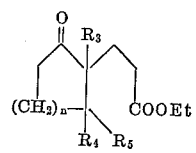

to obtain a yellow oily compound of the structure

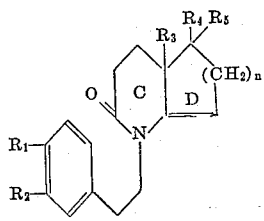

We have also found that the substituted phenylalkylamines may also be condensed with a keto ester or acid such as

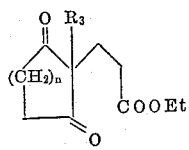

to give a compound of the structure

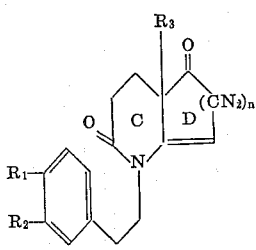

Step II is a reduction reaction of Ring D, of the compounds obtained in accordance with Step I. The reduction, for example, may be effected employing catalytic reducing agents such as gaseous hydrogen under pressure and palladium on carbon in an inert solvent such as alcohol. The reduction results in the formation of saturated Ring D of the structure

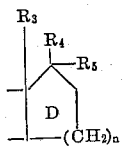

and in the reduction of the ketone to the corresponding alcohol such as

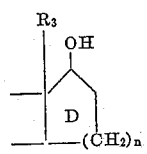

In the case where $R_3$ is hydrogen, the position of the double bond before reduction is such as to be common to rings C and D. For such a case the reduction is preferably carried out in the presence of an alkali.

In lactams such as III and IV, two diastereoisomeric forms are possible, depending upon the orientation of hydrogen attached at C—D ring junction which may be cis or trans with respect to $R_3$, and it is further the purpose of this invention to describe methods by which both diastereoisomeric forms may be obtained.

In order to obtain the diastereoisomeric products differing in their stereochemistry about the C—D ring fusion, the following modification of the above-described reaction sequence is generally recommended.

We have found that by carrying out a reductive condensation of the starting materials, i.e., involving the substituted phenylalkylamine and the cyclic keto ester or its corresponding acid, there is formed one or two isomeric saturated lactams of the formula:

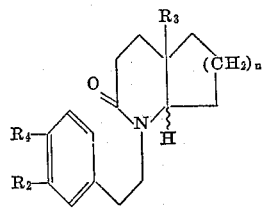

and, in addition, an isomeric mixture of amino acids having the formula:

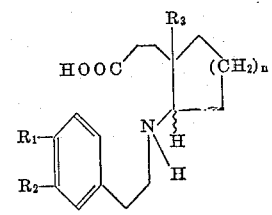

The reductive reaction is preferably carried out in an inert solvent such as methanol or ethanol over a hydrogenation catalyst such as palladium on carbon or platinum oxide and gaseous hydrogen is introduced under pressure. The mixture is kept at ambient temperature, such as 20 to 25° C.

When hydrogen absorption ceases, the solvent and catalyst are removed from the reaction mixture and the residue remaining contains the desired mixture of one or two isomeric lactams and one or two isomeric amino acids. We have found that, in many instances, when one lactam is obtained mixed with isomeric amino acids, the mixture can be heated to a temperature of about 70°, preferably by refluxing in a solvent such as ethanol, chloroform, or acetonitrile whereby one of the amino acid components of the mixture undergoes cyclization to give a further amount of the already formed lactam while the other component remains unchanged. In other instances, the preferential lactamization is not feasible and both lactams are formed and separated.

We have further found that the separation into lactam and amino acid fractions is dependent on the steric configuration around the potential steroid C—D ring junction, a facile ring closure of amino acid to lactam occurring with one steric configuration whereas the opposite configuration requires more drastic conditions to bring about lactam formation. As stated above, in many cases the difference of ease of lactamization is such as to permit a convenient separation of the isomeric reduction products—one as a lactam and one as an amino acid.

The amino acid which remains unchanged after heating the mixture in one of the above-named solvents may then be heated to a higher temperature, preferably melted under nitrogen, whereby it then undergoes cyclization to give the lactam corresponding to the formula III or IV, but having the opposite stereochemical configuration about the C—D ring fusion to that of the more easily formed lactam.

In order to further illustrate this invention but without being limited thereto, the following examples are given:

EXAMPLE 1

*1-(3,4-dimethoxyphenethyl)-3,4,7,8-tetrahydro-2,5(1H,6H)-quinolinedione*

A mixture of 50 g. of 2-(β-carbethoxyethyl)-1,3-cyclohexanedione and 42.5 g. of homoveratrylamine (0.235 mole of each) in 400 ml. xylene is refluxed for 6 hours. During this time 5.1 ml. of water is collected in a Dean-Stark trap. After the xylene is stripped, the dark oil is taken up in chloroform and the chloroform solution is washed with 5% aqueous $NaHCO_3$ followed by 2 N HCl and water. The solution is dried over MgSO₄ and the chloroform removed by evaporation. The residual oil is vacuum distilled, B.P. 230–234°/.02 mm. The yellow oily distillate is dissolved in 100 ml. ethyl acetate. After cooling for 16 to 24 hours the reaction product 1-(3,4-dimethoxyphenethyl)-3,4,7,8-tetrahydro-2,5(1H,6H) - quinolinedione precipitates out in the form of crystals, melting at 85 to 87° C.

EXAMPLE 2

*1,3,4,5,6,7-hexahydro-1-(m-methoxyphenethyl)-2H-1-pyrindin-2-one*

In the same way as described in Example 1, 36.8 g. of 2-(β-carbethoxyethyl)cyclopentanone and 30.2 g. of m-methoxyphenethylamine react to give 45.8 g. of 1,3,4,5,6,7-hexahydro-1-(m-methoxyphenethyl) - 2H - 1 - pyrindin-2-one in the form of a pale yellow oil, B.P. 199–202°/.25 mm.

EXAMPLE 3

*1-(3,4-dimethoxyphenethyl)-1,3,4,5,6,7-hexahydro-2H-1-pyrindin-2-one*

In the same way as described in Example 1, 17.0 g. of 2-(β-carbomethoxyethyl)cyclopentanone and 18.1 g. of homoveratrylamine react to give 23 g. of 1-(3,4-dimethoxyphenethyl)-1,3,4,5,6,7-hexahydro-2H - 1 - pyrindin-2-one in the form of a pale yellow oil, B.P. 220–230°/.75 mm. which solidifies to a waxy yellow solid. This solid is recrystallized from ether to give a product, M.P. 104–105°.

EXAMPLE 4

*1-(3,4-dimethoxyphenethyl)-6,7-dihydro-1H-1-pyrindine-2,5(3H,4H)-dione*

In the same way as described in Example 1, 2.2 g. of 2-(β-carboxyethyl)cyclopentane-1,3-dione and 2.3 g. of homoveratrylamine react to give upon removal of the chloroform 3.8 g. of 1-(3,4-dimethoxyphenethyl)-6,7-dihydro-1H-1-pyrindine-2,5(3H,4H)-dione in the form of a tan solid which is recrystallized from acetonitrile, M.P. 159–161° C.

EXAMPLE 5

*1-(3,4-dimethoxyphenethyl)-3,4,4a,5,6,7-hexahydro-4a-methyl-2(1H)-quinolone*

In the same way as described in Example 1, 10.0 g. of 2-(β-carboxyethyl)-2-methylcyclohexanone and 9.8 g. of homoveratrylamine react to give 16.3 g. of 1-(3,4-dimethoxyphenethyl)-3,4,4a,5,6,7-hexahydro-4a - methyl-2-(1H)-quinolone in the form of a pale yellow oil, B.P. 195–198°/.08 mm.

EXAMPLE 6

*1,3,4,4a,5,6-hexahydro-1-(3,4-dimethoxyphenethyl)-4a-methyl-2H-1-pyrindin-2-one*

In the same way as described in Example 1, 29.0 g. of 2(β-carboxyethyl)-2-methyl-cyclopentanone and 31.8 g. of homoveratrylamine react to give 37.4 g. of 1,3,4,4a,5,6-hexahydro-1-(3,4-dimethoxyphenethyl)-4a-methyl-2H - 1-pyrindin-2-one in the form of a pale yellow oil, B.P. 192–195°/.08 mm.

EXAMPLE 7

*3,4,7,8-tetrahydro-1-(m-methoxyphenethyl)-2,5 (1H,6H)-quinolinedione*

In the same way as described in Example 1, 10.6 g. of 2-(β-carbethoxyethyl)-1,3-cyclohexanedione and 7.55 g. of m-methoxyphenethylamine react to give 12 g. of 3,4,7,8 - tetrahydro-1-(m-methoxyphenethyl) - 2,5 - (1H, 6H)-quinolinedione in the form of a pale yellow oil, B.P. 220–240°/.5 mm. which solidifies on rubbing with ethylacetate, M.P. 96–97° C. Recrystallization from ethylacetate-petroleum ether raises the M.P. to 97–98° C.

EXAMPLE 8

*3,4,6,7-tetrahydro-1-(m-methoxyphenethyl)-4a-methyl-2,5-(1H,4aH)-quinolinedione*

In the same way as described in Example 1, 6.8 of 2-(β-carbethoxyethyl)-2-methyl-1,3-cyclohexanedione and 4.5 g. of m-methoxyphenethylamine react to give 5.8 g. of 3,4,6,7-tetrahydro - 1 - (m-methoxyphenethyl)-4a-methyl-2,5(1H,4aH)-quinolinedione in the form of a light yellow oil, B.P. 220–225°/.1 mm.

EXAMPLE 9

*6,7-dihydro-1-(m-methoxyphenethyl)-1H-1-pyrindine-2,5(3H,4H)-dione*

In the same way as described in Example 1, 7.85 g. of 2-(β-carboxyethyl)-1,3-cyclopentanedione and 6.98 g. of m-methoxyphenethylamine react to give 7.7 g. of 6,7-dihydro-1-(m-methoxyphenethyl) - 1H - 1 - pyrindine-2,5 (3H,4H)-dione in the form of a pale yellow oil, B.P. 219–222°/.07 mm. This oil crystallizes spontaneously to tan crystals, M.P. 112–117° C. Recrystallization from ethylacetate raises the M.P. to 119–120° C.

EXAMPLE 10

*1-(m-methoxyphenethyl)-3,4,4a,5,6,7-hexahydro-2(1H)-quinolone*

A mixture of 19.8 g. of 2-(β-carbethoxyethyl)-cyclohexanone and 15.1 g. of m-methoxyphenethylamine (0.10 mole of each) in 400 ml. xylene is refluxed for 6 hours. During this time 1.8 ml. of water is collected in a Dean-Stark trap. The xylene is stripped; the dark oil remaining is taken up in chloroform; and the chloroform solution is washed with 5% aqueous NaHCO₃, 2 N HCl and water. The solution is dried over MgSO₄, and the chloroform removed by evaporation. The residual oil is vacuum distilled, B.P. 210–220°/.22 mm. to give 1-(m-methoxyphenethyl)-3,4,4a,5,6,7-hexahydro-2(1H)-quinolone as a pale yellow viscous oil.

EXAMPLE 11

*1-(3,4-dimethoxyphenethyl)-octahydro-5-hydroxy-2-(1H)-quinolone*

A solution of 23.4 g. of 1-(3,4-dimethoxyphenethyl)-3,4,7,8-tetrahydro-2,5(1H,6H)-quinolinedione in 200 ml. absolute alcohol containing 1.5 g. KOH is charged to the Parr hydrogenator and reduced over 4.0 g. 10% Pd—C at 20–26° C. and at an initial hydrogen pressure of 55 p.s.i. gauge. Hydrogen uptake ceases after about 6 hours. The catalyst is filtered and the filtrate is acidified with concentrated HCl to pH 3–4. The precipitated KCl is filtered and the filtrate stripped to an oil. The oil is dissolved in 400 ml. benzene and the cloudy solution dried over MgSO₄. The clear solution is evaporated to an oil. The oil is dissolved in about 50 ml. of ethyl acetate and scratched to induce crystallization. After 3 days at 4–6° C. with occasional scratching the compound 1-(3,4-dimethoxyphenethyl)-octahydro - 5 - hydroxy - 2 - (1H)-quinolone settles out as a white solid, M.P. 131–139° C. This material can be recrystallized from ethyl acetate or used as is.

EXAMPLE 12

*2,3,4,4a,5,6-hexahydro-1-(m-methoxyphenethyl)-4a-methyl-2-oxo-1H-1-pyrindine-5-carboxylic acid*

To a refluxing solution of 12.0 g. (.056 mole) of 2-methyl-2-(β-carboxyethyl) - 3 - carboxycyclopentanone in 100 ml. xylene is added with stirring a solution of 8.5 g. (.056 mole) of m-methoxyphenethylamine. The mixture is refluxed for 2 hours, during which time 1.8 ml. water are collected in a Dean-Stark trap (theory 2.02 ml.). The solution is cooled and the clear solution is extracted twice with 5% NaOH; the combined NaOH solutions are washed once with ether and acidified with concentrated HCl. The acidic solution is extracted three times with ethyl acetate and the combined ethyl acetate solutions are washed once with water, dried over MgSO$_4$ and evaporated to dryness. The oily residue is triturated with ether to give 2,3,4,4a,5,6-hexahydro-1-(m-methoxyphenethyl)-4a-methyl-2-oxo-1H-1-pyrindine-5-carboxylic acid in the form of crystals, M.P. 123–126° C. The product recrystallized from ethyl acetate melts at 125–127° C.

EXAMPLE 13

*1-(3,4-dimethoxyphenethyl)-2,3,4,4a,5,6-hexahydro-4a-methyl-2-oxo-1H-1-pyrindine-5-carboxylic acid*

In the same way as described in Example 12, 21.4 g. of 2-(β-carboxyethyl)-2-methyl-3-carboxycyclopentanone and 18.1 g. of homoveratrylamine give 24.5 g. of 1-(3,4-dimethoxyphenethyl) - 2,3,4,4a,5,6 - hexahydro-4a-methyl-2-oxo-1H-1-pyrindine-5-carboxylic acid in the form of a white solid, M.P. 153–156° C.

EXAMPLE 14

*1-(3,4-dimethoxyphenethyl)-3,4,6,7-tetrahydro-4a-methyl-2,5-(1H,4aH)-quinolinedione*

A mixture of 22.6 g. of 2-(β-carbethoxyethyl)-2-methylcyclohexane-1,3-dione and 18.1 g. of homoveratrylamine in 330 ml. xylene is refluxed for 2 hours, 1.8 ml. of water being collected in a Dean-Stark trap. The xylene is removed by evaporation under reduced pressure and the oily residue taken up in benzene and placed on 1.7 kg. of alumina. The column is washed with 1 liter each of benzene, ether and a 20% solution of ethyl acetate in ether. The column is then washed with 3 liters of a 50% solution of ethyl acetate in ether. The solvent is removed from this fraction by evaporation. The pale yellow oil crystallizes on scratching and is recrystallized from ether to give 1-(3,4-dimethoxyphenethyl)-3,4,6,7-tetrahydo-4a-methyl-2,5(1H,4aH)-quinolinedione in the form of a white solid, M.P. 78–79° C.

EXAMPLE 15

*4,4a-dihydro-1-(m-methoxyphenethyl)-4a-methyl-1H-1-pyrindine-2,5-(3H,6H)-dione*

A solution of 45.5 g. of 2-(β-carboxyethyl)-2-methyl-1,3-cyclopentanedione and 37.8 g. of m-methoxyphenethylamine in 2.5 liters of methylene chloride is refluxed for 2½ hours under a modified Dean-Stark trap. A solution of 51.5 g. of dicyclohexylcarbodiimide in 100 ml. of methylene chloride is then added slowly. The resulting slurry is refluxed with stirring for 10 minutes, then cooled for 16–24 hours at 10° C. The slurry is filtered and the filtrate poured directly onto 3.75 kg. of alumina. The column is washed with 16 liters of methylene chloride and the solvent removed from this fraction to give 4,4a-dihydro-1-(m-methoxyphenethyl) - 4a - methyl-1H-1-pyrindine-2,5-(3H,6H)-dione in the form of a pale yellow oil.

EXAMPLE 16

*Octahydro-1-(m-methoxyphenethyl)-2H-1-pyrindine-2-one*

A solution of 13.85 g. of 1,3,4,5,6,7-hexahydro-1-(m-methoxyphenethyl)-2H-1-pyrindine-2-one in 100 ml. ethanol is shaken in a Parr bomb over 2.0 g. of 10% palladium on carbon catalyst at 20–25° and an initial hydrogen pressure of 50 p.s.i. gauge. Hydrogen absorption ceases after about 20 hours. The catalyst is removed by filtration and the ethanol is removed by distillation to obtain octahydro-1-(m-methoxyphenethyl)-2H-1-pyrindine-2-one in the form of a colorless oil.

EXAMPLE 17

*1-(3,4-dimethoxyphenethyl)-octahydro-2H-1-pyrindine-2-one*

In the same way as described in Example 16, 21.3 g. of 1 - (3,4 - dimethoxyphenethyl) - 1,3,4,5,6,7 - hexahydro-2H-1-pyrindine-2-one on reduction gives 1-(3,4-dimethoxyphenethyl)-octahydro-2H-1-pyrindine - 2 - one in the form of a colorless oil which crystallizes on scratching. Recrystallization from ether gives white crystals, M.P. 76–78° C.

EXAMPLE 18

*1-(3,4-dimethoxyphenethyl)-octahydro-4a-methyl-2(1H)-quinolone*

In the same way as described in Example 16, 10.0 g. of 1-(3,4-dimethoxyphenethyl) - 3,4,4a,5,6,7 - hexahydro-4a-methyl-2(1H)-quinolone, on reduction gives 1-(3,4-dimethoxyphenethyl)-octahydro - 4a - methyl - 2 - (1H)-quinolone in the form of a colorless oil which solidifies on scratching and can be recrystallized from ether—petroleum-ether in the form of white crystals, M.P. 93–94° C.

EXAMPLE 19

*Octahydro-1-(3,4-dimethoxyphenethyl)-4a-methyl-2H-1-pyrindin-2-one*

In the same way as described in Example 16, 13.2 g. of 1,3,4,4a,5,6-hexahydro - 1 - (3,4-dimethoxyphenethyl)-4a-methyl-2H-1-pyrindin-2-one on reduction gives octahydro-1-(3,4-dimethoxyphenethyl) - 4a - methyl - 2H - 1-pyrindin-2-one in the form of a clear colorless oil.

EXAMPLE 20

*1-(3,4-dimethoxyphenethyl)-tetrahydro-4a-methyl-1H-1-pyrindine-2,5(3H,6H)-dione*

In the same way as described in Example 16, 3.0 g. of 1-(3,4-dimethoxyphenethyl) - 4,4a - dihydro-4a-methyl-1H-1-pyrindine-2,5(3H,6H)-dione on reduction gives 1-3,4-dimethoxyphenethyl)-tetrahydro - 4a - methyl-1H-1-pyrindine-2,5(3H,6H)-dione in the form of a clear colorless oil.

EXAMPLE 21

*Tetrahydro-1-(m-methoxyphenethyl)-4a-methyl-1H-1-pyrindine-2,5(3H,6H)-dione*

In the same way as described in Example 16, 2.3 g. of 4,4a - dihydro-1-(m-methoxyphenethyl)-4a-methyl-1H-1-pyrindine-2,5(3H,6H)-dione on reduction gives tetrahydro - 1-(m-methoxyphenethyl)-4a-methyl-1H-1-pyrindine-2,5-(3H,6H)-dione in the form of a clear, colorless oil.

EXAMPLE 22

*Octahydro-5-hydroxy-1-(m-methoxyphenethyl)-2H-1-pyrindine-2-one*

In the same way as described in Example 16, 5.6 g. of 6,7 - dihydro - 1-(m-methoxyphenethyl)-1H-1-pyrindine-2,5(3H,4H)-dione on reduction gives octahydro-5-hydroxy-1-(m - methoxyphenethyl)-2H-1-pyrindin-2-one in the form of a white solid which is recrystallized from ethyl acetate to M.P. 130–131° C.

EXAMPLE 23

*1-(3,4-dimethoxyphenethyl)-octahydro-4a-methyl-2-oxo-1H-1-pyrindine-5-carboxylic acid*

A solution of 2.0 g. of 1-(3,4-dimethoxyphenethyl)-2,3,4,4a,5,6 - hexahydro - 4a-methyl-2-oxo-1H-1-pyrindine-5-carboxylic acid in 50 ml. of glacial acetic acid is shaken in a Parr bomb over 0.5 g. platinum oxide catalyst at 20–25° C. and an initial hydrogen pressure of 50 p.s.i. gauge. Hydrogen absorption ceases after 4 hours. The catalyst is removed by filtration and the solvent is removed by distillation under reduced pressure to obtain 1-(3,4-dimethoxyphenethyl)octahydro - 4a - methyl - 2 - oxo-

EXAMPLE 24

*Octahydro-1-(m-methoxyphenethyl)-4a-methyl-2-oxo-1H-1-pyrindine-5-carboxylic acid*

In the same way as described in Example 23, 2.0 g. of 2,3,4,4a,5,6 - hexahydro - 1 - (methoxyphenethyl) - 4a-methyl-2-oxo-1H-1-pyrindine-5-carboxylic acid on reduction gives octahydro-1-(m-methoxyphenethyl)-4a-methyl-2-oxo-1H-1-pyrindine-5-carboxylic acid in the form of a solid residue which after recrystallization from ethyl acetate melts at 173–174° C.

EXAMPLE 25

*Octahydro-5-hydroxy-1-(m-methoxyphenethyl)-2-(1H)-quinolone*

In the same way as described in Example 11, 6.1 g. of 3,4,7,8 - tetrahydro - 1 - (m - methoxyphenethyl) - 2,5-(1H,6H)-quinoline-dione gives upon removal of solvent octahydro - 5 - hydroxy - 1 - (m - methoxyphenethyl) - 2-(1H)-quinolone in the form of a colorless oil.

EXAMPLE 26

*Octahydro-5-hydroxy-1-(m-methoxyphenethyl)-2-(1H)-quinolone acetate*

A solution of 6.1 g. of octahydro-5-hydroxy-1-(m-methoxyphenethyl)-2-(1H)-quinolone in a mixture of 75 ml. pyridine and 20 ml. acetic anhydride is left for 16–24 hours at 20–25° C. The mixture is evaporated under high vacuum to remove excess pyridine and acetic anhydride to obtain octahydro - 5 - hydroxy-1-(m-methoxyphenethyl)-2-(1H)-quinolone acetate in the form of pale yellow oil.

EXAMPLE 27

*1-(3,4-dimethoxyphenethyl)-octahydro-5-hydroxy-2-(1H)-quinolone acetate*

In the same way as Example 26, 7.4 g. of 1-(3,4-dimethoxyphenethyl) - octahydro - 5 - hydroxy - 2 - (1H)-quinolone gives 1-(3,4-dimethoxyphenethyl)-octahydro-5-hydroxy-2-(1H)-quinolone acetate in the form of a pale yellow oil.

EXAMPLE 28

*1-(3,4-dimethoxyphenethyl)-hexahydro-2,5-(1H,6H)-quinolinedione*

A solution of 5.0 g. of 1-(3,4-dimethoxyphenethyl)-octahydro - 5 - hydroxy-2-(1H)-quinolone in 550 ml. reagent grade acetone is treated all at once at 12° C. with rapid stirring with 4.5 ml. of 8 N chromic anhydride in sulfuric acid. A green slurry is formed which is stirred 10 minutes, then diluted with 30 ml. water. The acetone is removed by distillation, and the green aqueous solution is extracted 3 times with 50 ml. portions of benzene. The benzene solution is washed with a 5% aqueous solution of sodium bicarbonate, dried and the benzene is evaporated to obtain 1 - (3,4-dimethoxyphenethyl)-hexahydro-2,5-(1H,6H)-quinolinedione as a yellow oil. The yellow oil can be recrystallized from a mixture of ethyl acetate and ether. The recrystallized from melts at 124–126° C.

EXAMPLE 29

*Hexahydro-1-(m-methoxyphenethyl)-2,5-(1H,4aH)-quinolinedione*

In the same way as described in Example 28, 7.0 g. of octahydro - 5 - hydroxy - 1 - (m - methoxyphenethyl)-2 - (1H)-quinolone gives hexahydro-1-(m-methoxyphenethyl) - 2,5 - (1H,4aH) - quinolinedione in the form of a pale yellow oil.

EXAMPLE 30

*1-(3,4-dimethoxyphenethyl)-5,5-ethylenedioxy-octahydro-4a-methyl-2H-1-pyrindin-2-one*

A solution of 3.0 g. of 1-(3,4-dimethoxyphenethyl) tetrahydro - 4a - methyl - 1H - 1 - pyrindine - 2,5(3H,6H)-dione in 50 ml. benzene containing 2.0 ml. of ethylene glycol and 0.1 g. of p-toluene-sulfonic acid is refluxed for 5 hours under a Dean-Stark trap. The solution is washed twice with a 5% aqueous solution of sodium bicarbonate, dried, and the benzene is removed by distillation to give 1 - (3,4 - dimethoxyphenethyl) - 5,5 - ethylenedioxyoctahydro - 4a - methyl - 2H - 1 - pyrindin - 2- one in the form of a pale yellow oil.

EXAMPLE 31

*1-(3,4-dimethoxyphenethyl)-5,5-ethylenedioxy-octahydro-2-(1H)-quinolone*

In the same way as described in Example 30, 1.0 g. of 1 - (3,4 - dimethoxyphenethyl) - hexahydro-2,5-(1H,6H)-quinolinedione gives 1 - (3,4 - dimethoxyphenethyl) - 5,5-ethylenedioxy-octahydro-2(1H)-quinolone in the form of a pale yellow oil.

EXAMPLE 32

*5,5-ethylenedioxyoctahydro-1-(m-methoxyphenethyl)-4a-methyl-2H-1-pyrindine-2-one*

In the same way as described in Example 30, 1.3 g. of tetrahydro - 1 - (m - methoxyphenethyl) - 4a - methyl-1H - 1 - pyrindine - 2,5(3H,6H)-dione gives 5,5-ethylenedioxyoctahydro - 1 - (m - methoxyphenethyl)-4a-methyl-2H-1-pyrindine-2-one in the form of a pale yellow oil.

EXAMPLE 33

*Preparation of trans-N-(m-methoxyphenethyl)-2-(β-carboxyethyl)-cyclopentylamine and cis-octahydro-1-(m-methoxyphenethyl)-2H-1-pyrindine-2-one*

A mixture of 15.1 g. of m-methoxyphenethylamine and 15.6 g. of 2-(β-carboxyethyl) cyclopentanone in 300 ml. methanol is shaken in a Parr bomb over 3.0 g. of 10% Pd on C catalyst at 20–25° under an initial hydrogen pressure of 50 p.s.i. gauge. Hydrogen absorption ceases after about 20 hours. The catalyst is removed by filtration and the methanol is removed by distillation. The oily residue is dissolved in 500 ml. of boiling acetonitrile and the mixture refluxed for 15 minutes and cooled to 10° for 16 hours. The solid is filtered to give 7.25 g. of pure trans N-(m-methoxyphenethyl) - 2 - (β - carboxyethyl)-cyclopentylamine as white needles M.P. 143–4°.

The filtrate is stripped to an oil and the oily residue is partitioned between water and ether. The ether phase is dried over magnesium sulfate and the ether removed by distillation. The colorless oily residue is pure cis octahydro - 1 - (m-methoxyphenethyl)-2H-1-pyrindine-2-one and amounts to 17.0 g.

EXAMPLE 34

*Preparation of trans-octahydro-1-(m-methoxyphenethyl)-2H-1-pyrindine-2-one*

1.5 grams of trans-N-(m-methoxyphenethyl)-2-(β-carboxyethyl)-cyclopentylamine was melted under nitrogen by immersion in an oil bath pre-heated to 170°, and held at this temperature for 5 minutes until bubbling ceased. The oil solidified on cooling to give trans octahydro-1-(m-methoxyphenethyl) - 2H - 1-pyrindine-2-one as colorless cubes. M.P. 81–2°.

EXAMPLE 35

*Preparation of cis - tetrahydro-1-(m-methoxyphenethyl)-4a - methyl - 1H-1-pyrindine-2,5-(3H,6H)-dione and trans - 2 - methyl - 2 - (β-carboxyethyl)-3-keto-N-(m-methoxyphenethyl)-cyclopentylamine*

A mixture of 7.55 g. of m-methoxyphenethylamine and 9.2 g. of 2-methyl-2-(β-carboxyethyl)-1,3-cyclopentanedione in 250 ml. ethanol is shaken in a Parr bomb over 3.5 g. of 10% palladium on carbon catalyst at 20-25° C. and an inital hydrogen pressure of 50 p.s.i. gauge, hydrogen absorption ceases after about 20 hours. The catalyst is removed by filtration and the ethanol is removed by distillation. The oily residue is partitioned between water and ether and the ether layer dried over magnesium sulfate and evaporated to obtain cis tetrahydro-1-(m-methoxyphenethyl) - 4a - methyl - 1H-1-pyrindine-2,5-(3H, 6H)-dione as a colorless oil.

The aqueous phase is concentrated under high vacuum to give crude trans 2-methyl-2-(β-carboxyethyl)-3-keto-N-(m-methoxyphenethyl)-cyclopentylamine containing a small amount of the cis compound as a yellow oil.

EXAMPLE 36

Preparation of cis-1-(3,4-dimethoxyphenethyl)-octahydro-4a-methyl-2-(1H)-quinolone A mixture of 1.81 g. of homoveratrylamine and 1.84 g. of 2-methyl-2-(β-carboxyethyl)-cyclohexanone in 50 ml. ethanol is shaken in a Parr bomb over 0.1 g. of platinum oxide catalyst at 20-25° and an initial hydrogen pressure of 50 p.s.i. gauge. Hydrogen absorption ceases after about 20 hours. The catalyst is removed by filtration and the solvent is removed by distillation. The oily residue is partitioned between water and ether. The ether is dried over magnesium sulfate and evaporated to obtain cis 1-(3,4-dimethoxyphenethyl)-octahydro-4a-methyl-2 - (1H)-quinolone as a colorless oil.

It is to be understood that the foregoing detailed description is given merely by way of illustration and that many variations may be made therein without departing from the spirit of our invention.

Having described our invention, what we desire to secure by Letters Patent is:

1. A compound selected from the group consisting of those having the formulas:

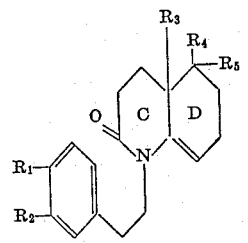

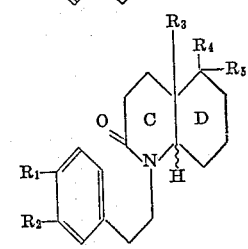

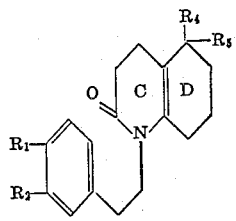

wherein $R_1$ and $R_2$ each is a member selected from the group consisting of hydrogen, hydroxy, and lower alkoxy; $R_3$ is a member selected from the group consisting of hydrogen, and lower alkyl; $R_4$ is a member selected from the group consisting of hydrogen, lower alkyl, lower alkoxy, alkenyl, and $R_5$ is a member selected from the group consisting of hydrogen, hydroxy, acyloxy, in which acyl is that derived from a carboxylic acid, lower alkoxy, —COOH, —COOR$_{11}$ in which $R_{11}$ is lower alkyl; and $R_4$ and $R_5$ taken together with the carbon atom to which they are attached form a member selected from the group consisting of keto and cyclic ketal.

2. 3,4,6,7 - tetrahydro - 1 - (m - methoxyphenethyl)-4a-methyl-2,5-(1H,4aH)quinolinedione.

3. 1 - (3,4 - dimethoxyphenethyl) - 3,4,6,7 - tetrahydro-4a-methyl-2,5(1H,4aH)-quinolinedione.

4. 1 - (3,4 - dimethoxyphenethyl) - 3,4,4a,5,6,7 - hexahydro-4a-methyl-2-(1H)-quinolone.

5. 1 - (3,4 - dimethoxyphenethyl) - decahydro - 4a-methyl-2-(1H)-quinolone.

6. 3,4,7,8 - tetrahydro - 1 - (m - methoxyphenethyl)-2,5-(1H,6H)-quinolinedione.

7. Octahydro-5-hydroxy - 1 - (m - methoxyphenethyl)-2-(1H)-quinolone.

8. Octahydro-5-hydroxy - 1 - (m - methoxyphenethyl)-2-(1H)-quinolone acetate.

9. Hexahydro-1 - (m - methoxyphenethyl) - 2,5 - (1H, 4aH)-quinolinedione.

10. 1-(3,4 - dimethoxyphenethyl) - 3,4,7,8 - tetrahydro-2,5-(1H,6H)-quinolinedione.

11. 1-(3,4 - dimethoxyphenethyl) - 3,4,4a,7,8,8a - hexahydro-2,5-(1H,6H)-quinolinedione.

12. 1-(3,4 - dimethoxyphenethyl) - 5,5 - ethylenedioxy-3,4,4a,5,6,7,8,8a-octahydro-2-(1H)-quinolone.

13. 1 - (3,4 - dimethoxyphenethyl) - 3,4,4a,5,6,7,8,8a-octahydro-5-hydroxy-2-(1H)-quinolone.

14. 1 - (3,4 - dimethoxyphenethyl) - 3,4,4a,5,6,7,8,8a-octahydro-5-hydroxy-2-(1H)-quinolone acetate.

References Cited

Kanaoka: Chem. Pharm. Bull., vol. 7, p. 595–7 (1959).

ALEX MAZEL, *Primary Examiner.*

D. DAUS, *Assistant Examiner.*